United States Patent
Mantri et al.

(10) Patent No.: US 6,732,281 B1
(45) Date of Patent: May 4, 2004

(54) SYSTEM AND METHOD FOR LOADING DATA ONTO CARRIERS

(75) Inventors: Ravi G. Mantri, Grass Valley, CA (US); Jeffrey C. Strait, Nevada City, CA (US)

(73) Assignee: 3Com Corporation, Marlborough, MA (US)

( * ) Notice: Subject to any disclaimer, the term of this patent is extended or adjusted under 35 U.S.C. 154(b) by 612 days.

(21) Appl. No.: 09/583,833

(22) Filed: May 31, 2000

(51) Int. Cl.[7] .............................. G06F 1/26; H04J 15/00
(52) U.S. Cl. ....................... 713/300; 713/320; 370/464
(58) Field of Search ................................. 713/300, 320; 370/431, 464, 493, 210, 252; 375/253, 254, 240, 346, 260, 222

(56) References Cited

U.S. PATENT DOCUMENTS

| | | | | |
|---|---|---|---|---|
| 5,812,599 A | * | 9/1998 | Van Kerckhove | 375/260 |
| 5,960,327 A | * | 9/1999 | Eaton et al. | 340/7.37 |
| 6,075,821 A | * | 6/2000 | Kao et al. | 375/260 |
| 6,122,247 A | * | 9/2000 | Levin et al. | 375/260 |
| 6,144,696 A | * | 11/2000 | Shively et al. | 375/222 |
| 6,452,907 B1 | * | 9/2002 | Levin | 370/252 |

FOREIGN PATENT DOCUMENTS

EP 957615 A2 * 11/1999 ........... H04L/27/26

OTHER PUBLICATIONS

Zheng et al, Parallel transmission framework for layered coded multimedia data over spectrally shaped channels, 1999 IEEE, pp. 1678–1682.*

* cited by examiner

Primary Examiner—Dennis M. Butler
Assistant Examiner—Suresh K Suryawanshi
(74) Attorney, Agent, or Firm—McDonnell Boehnen Hulbert & Berghoff LLP

(57) ABSTRACT

A system and method for providing bit-loading enhancement is provided, including methods of determining an extended bit capacity for a plurality of carriers, wherein a first portion of the plurality of carriers is loaded and a second portion of the plurality of carriers is initially unloaded and bits are allocated between said first and second portions in accordance with power requirements for loading bits onto said first or second portion of the plurality of carriers, as well as methods of optimizing the average signal to noise margin for a plurality of carriers, wherein a first portion of the plurality of carriers is loaded and a second portion of the plurality of carriers is initially unloaded, and bits are loaded from the first portion onto the second portion in accordance with a power savings related to such a loading from the first portion onto the second portion.

23 Claims, 4 Drawing Sheets

SYSTEM AND METHOD FOR LOADING DATA ONTO CARRIERS

FIELD OF THE INVENTION

This present invention relates generally to telecommunication systems and more particularly to loading carriers in a multi-carrier system.

BACKGROUND OF THE INVENTION

In today's modern world, businesses and residential users are demanding faster network access to the Internet. The high demand for faster network access is putting pressure on vendors and service providers to choose network transmission technologies that will satisfy the emerging demand. The choice of network transmission technologies is critical since it may affect service, cost, and ultimately vendor/service provider success.

Many of the vendors and service providers have chosen to pursue digital subscriber line (DSL) technology and more specifically asymmetrical DSL (ADSL) for providing fast Internet access to business and residential users. ADSL often provides high-speed data transmission over standard phone lines while maintaining voice traffic on the same lines. ADSL is seen as a cost-effective alternative to other network transmission technologies. High speed data transmission, however, may be best achieved by utilizing ADSL modems offering automatic rate adaptation, permitting the maximum data rate based on achievable data-carrying capacity of any given line. Presently, American National Standards Institute (ANSI) T1.413 standard discrete multitone (DMT)-based ADSL modems provide for rate adaptation. Although non-DMT based ADSL modems may be configured to handle variable data rates, the configuration may be complicated and costly.

ADSL technology exploits the relatively high bandwidth of copper loops by converting twisted-pair copper telephone wires into paths for multimedia, data communications, and Internet access. Typically, ADSL supports 1.544 to 6 Mbps transmission downstream and 640 kb/s upstream. ADSL service may be provided by connecting a pair of modems, one often located in the telephone company's central office (CO) and the other located at the customer premises, over a standard telephone line.

ADSL modems offering automatic rate adaptation may permit the maximum data rate based on achievable data-carrying capacity of any given line. Rate adaptation is the ability to automatically correlate the connected data rate to distance extremes (e.g., distance between the CO and the customer premise), interference, and noise to provide the maximum date rate for any line conditions. Noise may include crosstalk from other services, near end echo, analog to digital conversion quantization, hardware noise, jitter, and intersymbol interference.

An ADSL modem utilizing ANSI appointed DMT as the modulation scheme segments the frequency spectrum on a copper line into 256 channels. Each 4 kHz channel is capable of carrying up to 15 data bits and a minimum of 2 data bits due to ANSI T1.413 standard. During channel analysis, a wide-band test signal sent over the 256 channels is transmitted from the ADSL terminal unit at the CO (ATU-C) to an ADSL remote terminal unit (ATU-R) at the customer premises. The ATU-R measures and updates the noise content of each of the channels received and then determines whether a channel has sufficient quality to be used for further transmission. Depending on the quality, the ATU-R may instruct the ATU-C how much data this channel should carry relative to the other channels that are used. Often, this procedure maximizes performance and minimizes error probability at any data specific rate. For instance, with a DMT modem, bit distribution may avoid noise by not loading bits onto channels that are corrupted by AM radio interference. The DMT modem may also lower bit distribution at the frequencies where notching occurs.

However, due to ADSL ANSI T1.413, standard requirements the minimum amount of bits a channel may support referred to as bit loading, are 2 bits often rendering bit loading methods sub-optimal. Often times during channel analysis one or more channels may be capable of carrying one bit and as a result, according to ANSI T1.413, is inactivated. Many bit loading processes do not make a concerted effort to re-activate these inactivated channels perhaps leading to reduced throughput.

Thus there is a need for effectively bit loading channels with a concerted effort to re-activate channels and to increase available throughput of both upstream and downstream channels.

SUMMARY OF THE INVENTION

The system and method for providing bit loading enhancement preferably re-activates unloaded channels to increase available throughput of both upstream and downstream channels. The method attempts to increase available throughput while maximizing power savings by determining an extended bit capacity and optimizing the average signal to noise margin.

In accordance with one aspect, a method for determining an extended bit capacity for a set of carriers includes a first portion of carriers that are loaded and a second portion of carriers that are initially unloaded. The method includes the step of determining a first power requirement for allocating one bit onto each of two carriers of the first portion and determining a second power requirement for allocating two bits onto one carrier of the second portion. The method then includes allocating two bits onto the one carrier of the second portion in accordance with the first power requirement and the second power requirement. If the first power requirement is greater than the second power requirement, then two bits are allocated onto the one carrier of the second portion. Otherwise, one bit is allocated onto one carrier of the first portion.

In accordance with another aspect, a method for optimizing the average signal to noise margin for a set of carriers includes a first portion of the carriers that are loaded and a second portion of the carriers that are initially unloaded. The method includes the step of determining a power saving resulting from removing one bit from each of two carriers of the first portion and determining a power requirement to load two bits onto one carrier of the second portion. The method then includes loading two bits onto one carrier of the second portion until the power requirement is greater than or equal to the power saving.

The system and method for bit loading enhancement makes a concerted effort to re-activate unloaded channels perhaps leading to increased throughput. The system and method attempts to bit load initially unloaded carriers to increase the frame size transmitted over a set of channels. To accomplish increased throughput, power is obtained from carefully chosen loaded carriers and applied to initially unloaded carriers attempting to reactivate the initially unloaded carriers. As a result, the set of carriers may have a net gain of data carrying bits without increasing the nominal power spectral density of the transmitted discrete multitone signal within the pass band. Thus, the system and method may attempt to re-activate unloaded channels to increase available throughput for both upstream and downstream channels.

The foregoing and other objects, features and advantages of the system and method for designating a primary reference source will be apparent from the following more particular description of preferred embodiments of the device and method as illustrated in the accompanying drawings

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
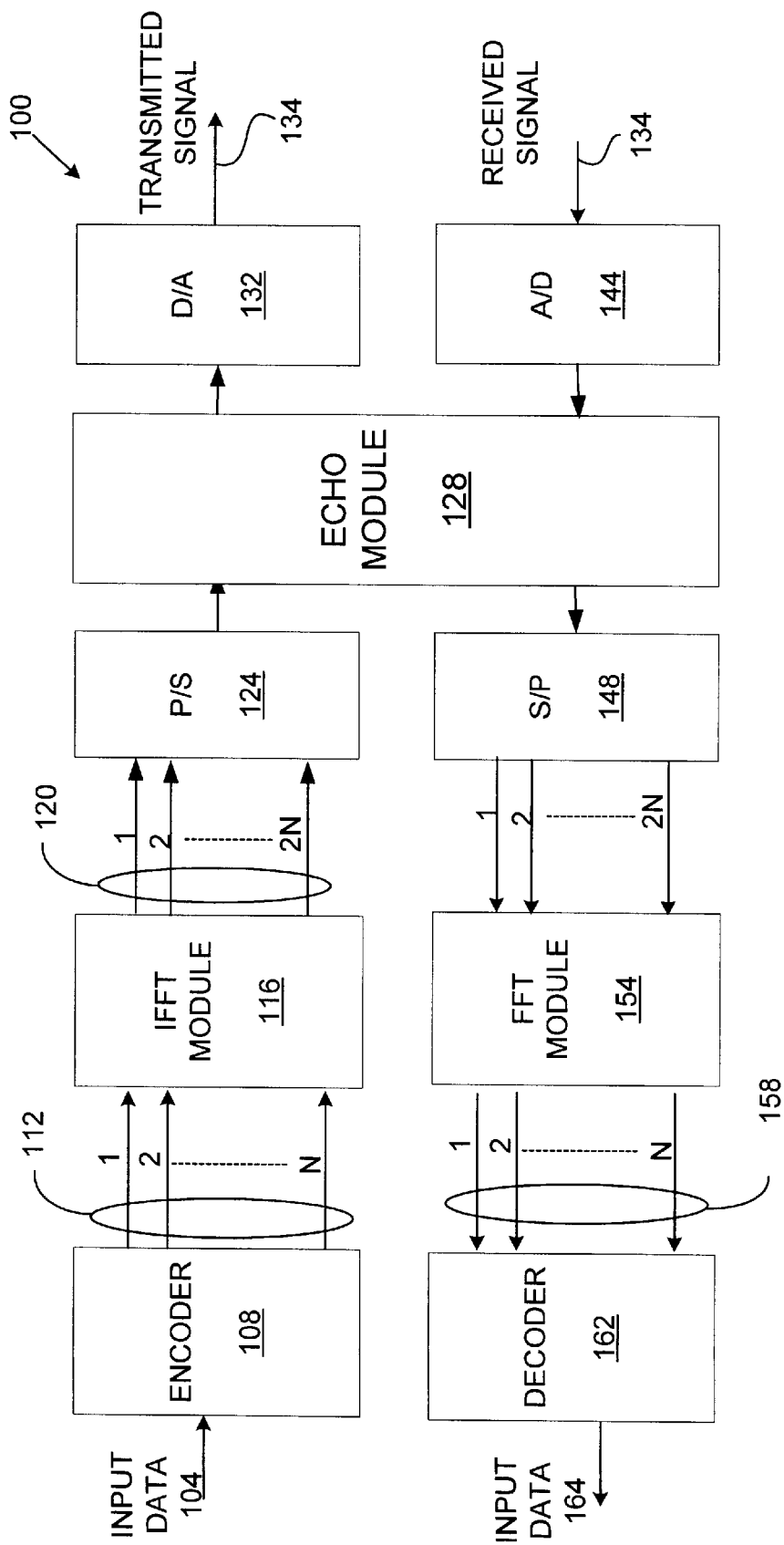
FIG. 1 is a diagram illustrating an exemplary remote transceiver utilizing the bit loading system and method.

FIG. 1 illustrates a diagram of a preferred embodiment of a remote transceiver 100 that includes the bit loading system and method. The remote transceiver (ATU-R) 100 is preferably adapted for communication with a transceiver (ATU-C) located at a central office and/or with other remote transceivers. The ATU-R 100 exchanges data with the ATU-C and/or the other remote transceiver preferably according to the ADSL ANSI T1.413 standard, the contents of which are incorporated by reference. The remote transceiver 100 may be located at a customer premise including any location providing connection over a transmission line 134 with a central office and/or with other ATU-Rs (not shown). The transmission line 134 may include any transmission medium such as twisted pair, fiber optic, coax, and microwave.

Data (e.g., in the form of bits) 104 is input into the ATU-R 100. An encoder 108 takes the data 104 and encodes it into N QAM "(Quadrature Amplitude Modulation)" constellation points (there are N complex numbers defining amplitude and phase of each carrier). As a result, the encoder 108 loads data 104 onto N carriers 112. Each carrier of the N carriers 112 corresponds to a channel. The number of channels (e.g., N channels) utilized in data transmission is typically determined during initialization between the communicating transceivers such as the ATU-R 100 and another transceiver (not shown). According to the ANSI T1.413 standard, the ATU-R 100 may utilize up to 256 channels separated by approximately 4 kilohertz. The first 32 channels in the range from 0 to approximately 138 kilohertz could be full duplex channels while the remaining 224 channels in the frequency range from 138 kilohertz to 1.1 megahertz are half duplex channels. Generally, for the 32 channels in the full duplex range, echo cancellation performed by the cancellation module 128 may be used to cancel unwanted signals caused by a transmitted signal. According to the ANSI T1.413, each loaded channel may support a minimum of 2 bits to up to 15 bits of QAM information. The actual number of bits a channel supports various due to the spectral response of the transmission line 134 such as a telephone line. The encoder 108 iteratively loads bits onto available carriers by obtaining power from loaded carriers with high SNR margin, for the purpose of activating an otherwise unloaded carrier (e.g., a carrier having less than 2 bits) preferably resulting in at least a net gain of one bit per set of carriers without increasing the nominal power spectral density of the signal. The encoder 108 may exchange power from carrier to carrier by increasing the fine gain adjustment to add power and by decreasing the fine gain adjustment to decrease power. The encoder 108 may also maximize the average signal to noise margin (described in more detail later) thus providing a larger "barrier" against channel noise to prevent an increase in the bit error rate.

The loaded carriers are input into the IFFT module 116. The input into the IFFT module 116 is a vector of QAM constellation points defining the amplitude and phase of each carrier. Output 120 of the IFFT module 116 consist of time domain samples that are sent to a parallel to serial converter 124 to be transformed into a time domain signal. The time domain signal is then sent to a digital to analog converter 132 and consequently broadcast onto the transmission line 134.

At the receive side of the transceiver 100, the FFT module 154 performs the complement operation to the IFFT module 116. The received signal is converted into a digital time domain signal by the analog to digital converter (A/D) 144 from which the signal is sent into a serial to parallel converter 148 and into the FFT module 154. The received N carriers 158 from the FFT module 154 are transformed back into corresponding amplitude and phase information and then decoded back into a data stream of bits 164 by a decoder 162.

Before data 104 is encoded and input into the IFFT module 116, a bit loading table is preferably generated and utilized by the encoder 108. Typically, the bit loading table is calculated during initialization according to measured signal to noise ratio (SNR) to allow optimal use of channel capacity. The bit loading table includes for each channel, a number of bits that the particular channel may support. For instance, to construct a bit loading table, a wide band test signal may be sent over the transmission line 134 between the ATU-R 100 and the ATU-C. The wide band test signal is sent using the maximum number of available carriers (e.g., 256). Upon receipt of the wide band test signal, the signal is evaluated to determine the spectral response of the transmission line 134. The results of the channel analysis may provide information to determine the SNR for each carrier.

The SNR for each carrier is often related to the number of possible bits that may be loaded onto a carrier. For instance, carriers having high SNR may carry more bits than low SNR carriers. Table 1 illustrates the calculated requirements to support the QAM constellations as defined by ANSI T1.413 with a bit error rate (BER) of 10–7 and zero margin. The margin characterizes how close the loaded carrier has come to its theoretical maximum for a given channel and its transmit energy. A margin of zero corresponds to an optimally loaded channel. Loading is limited by the ADSL standard to 2–15 bits per channel and the margin requirement or request is often determined during initialization. A typical margin requirement or request may be between 2.5 dB and 6 dB. For instance, if it is desired to load a carrier with two bits and the required margin is set at 6 dB then the SNR level must be at least 20.3203 dB according to Table 1. With a margin of 6 dB, the carrier may tolerate 6 dB of channel noise, before the BER for the data loaded on that carrier becomes greater than 10-7.

TABLE 1

| BITS | SNR (dB) | SNR (dB) with a 6 dB margin |
| --- | --- | --- |
| 2 | 14.3203 | 20.3203 |
| 3 | 19.1100 | 25.1100 |
| 4 | 21.3100 | 27.3100 |
| 5 | 24.4627 | 30.4627 |
| 6 | 27.5425 | 33.5425 |
| 7 | 30.5871 | 36.5871 |
| 8 | 33.6145 | 39.6145 |
| 9 | 36.6333 | 42.6333 |
| 10 | 39.6478 | 45.6478 |
| 11 | 42.6603 | 48.6603 |
| 12 | 45.6716 | 51.6716 |
| 13 | 48.6825 | 54.6825 |
| 14 | 51.6930 | 57.6930 |
| 15 | 54.7035 | 60.7035 |

Figure 2:
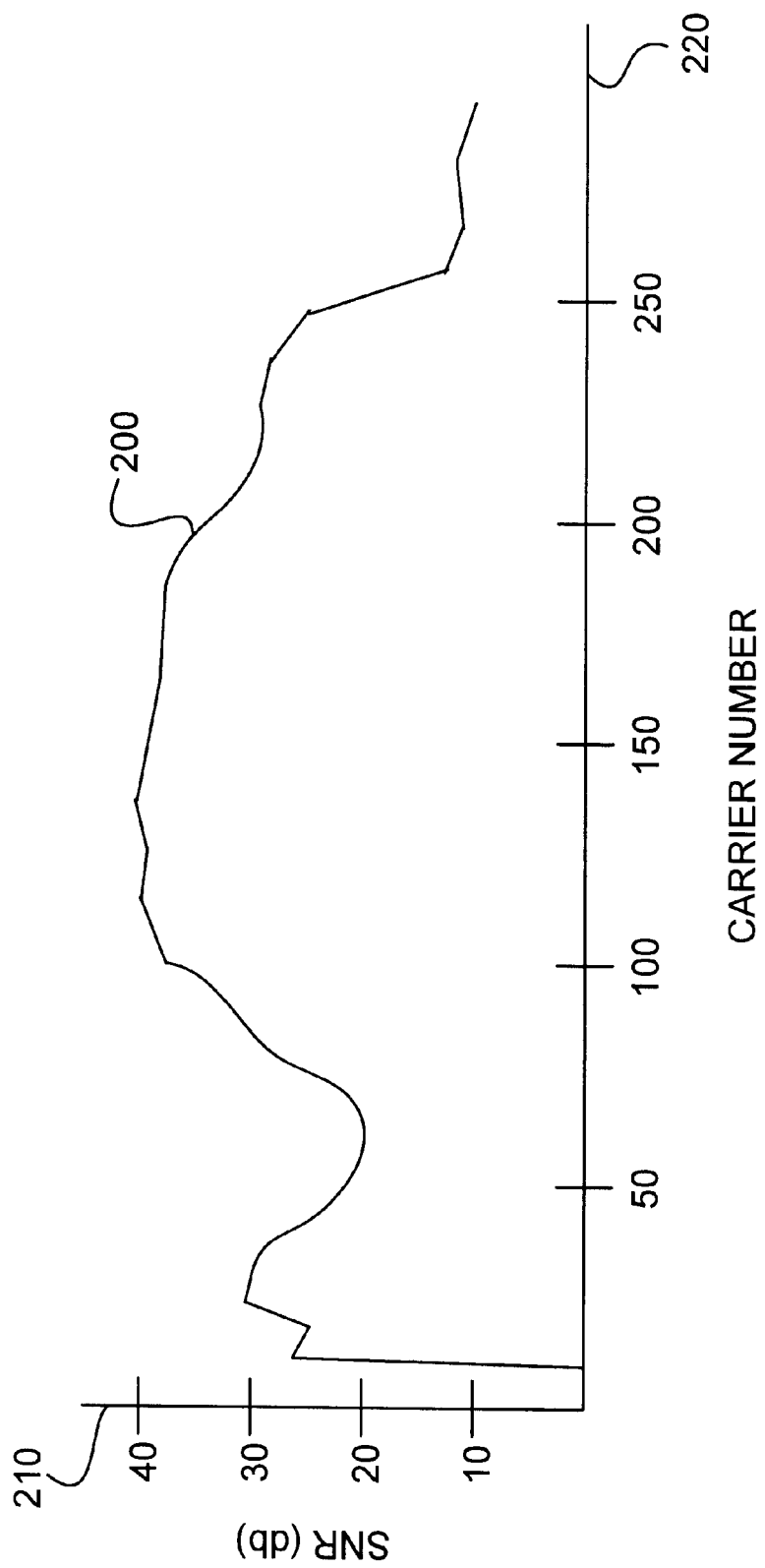
FIG. 2 is a diagram illustrating an exemplary measured SNR per channel number found during channel analysis.

During initialization, the SNR is calculated for each carrier. FIG. 2 illustrates an exemplary measurement of SNR 200 for each carrier. The Y-axis 210 corresponds to the measured SNR (dB) during startup. The X-axis 220 corresponds to the carrier (e.g., 256 carriers sent over 256 channels) and consequently to each channel the carrier was sent over. Varying SNR levels for carriers often result from channels having more or less attenuation than other channels and also due to channel specific noise disturbances such as interference of an AM radio station, NEXT, and FEXT. If channel attenuation is too great or noise level is too high, the channel may be deactivated. In addition, as the transmission line 134 is lengthened, increased channel attenuation may occur and as a result less bit loading may occur on the influenced channels possibly leading to transmission of a smaller frame size (i.e., frame is the amount of bits transmitted by all of the loaded carriers).

Figure 3:
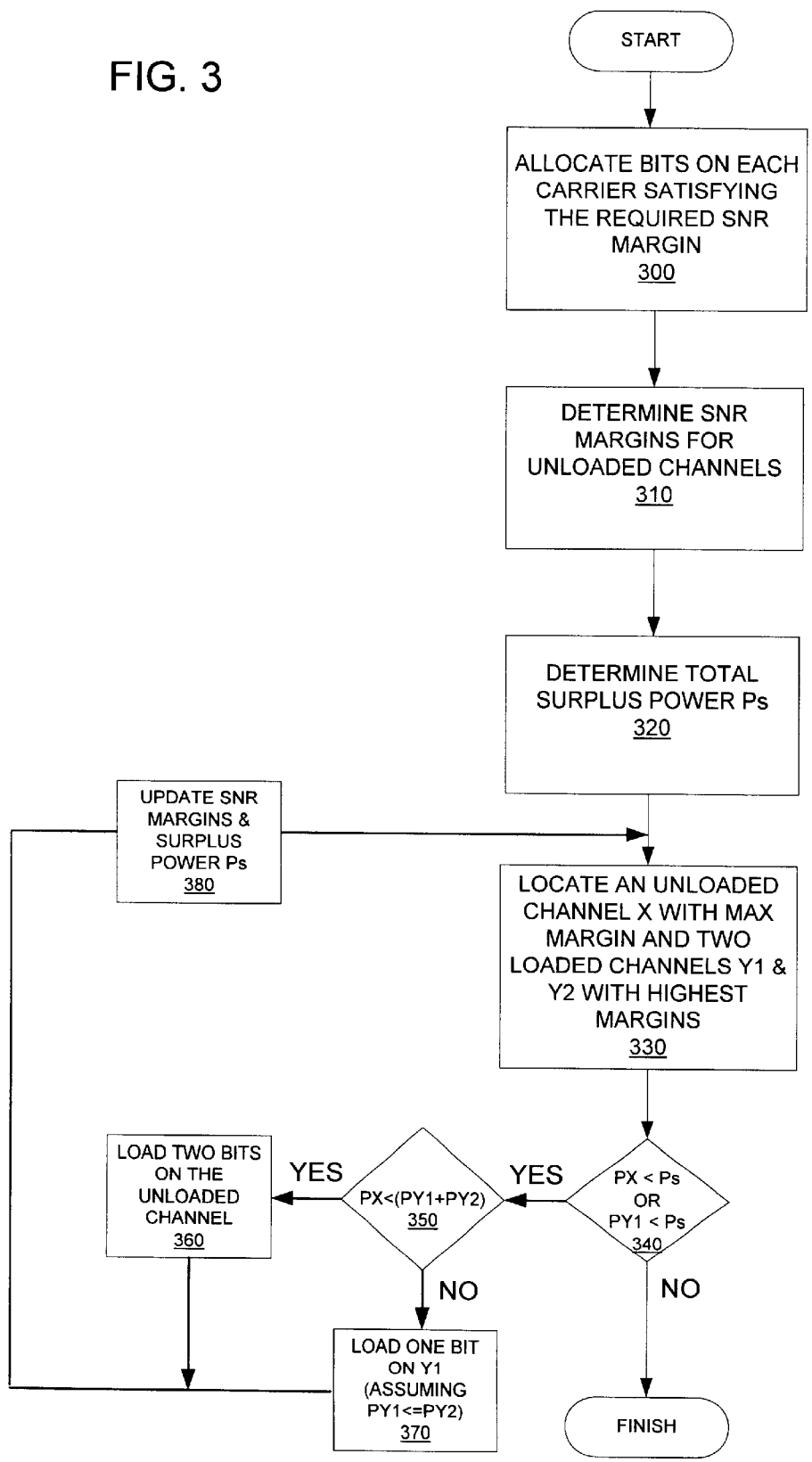
FIG. 3 is a flow/diagram of a preferred embodiment of a method for estimating bit capacity.

The total number of bits transmitted in one frame is the sum of the bits carried by all of the active carriers. While maximizing the number of bits loaded onto carriers along with maintaining a requested or required SNR margin level, an exemplary method in FIG. 3 illustrates a flowchart for determining the frame capacity allowable under current channel and noise conditions. At step 300, the maximum allowable bits are allocated for each carrier preferably satisfying the required or requested SNR margin. The required or requested SNR margin may be determined during initialization. The carriers loaded at step 300 are carriers that have a measured SNR level, providing a capability of loading at least two bits, preferably satisfying the required or requested margin.

For instance, according to Table 1 loading 2-bits with a required or requested margin of 6 dB onto a carrier must have a measured SNR level of 20.32 dB. In addition, according to Table 1 loading 3 bits with a required or requested margin of 6 dB onto a carrier must have a measured SNR level of 25.11 dB. Carriers may be loaded with a number of bits preferably in integer values ranging from a minimum of 2 bits up to 15 bits if the carrier satisfies the required or requested SNR margin. Typically, any carrier having a measured SNR level above 20.32 dB would be loaded with at least two bits. However, since the encoder may apply a fine gain adjustment of ±2.5 dB for each carrier, carriers that have a measured SNR level in the range above 17.5 dB and below 20.32 dB may be initially unloaded, but may be potential candidates for loading with gain adjustment.

Then at step 310, SNR margins are measured for the unloaded carriers assuming 2 bits have been loaded (e.g., requiring at least 14.3203 dB for two bits). For instance, if the measured SNR margin is 19 dB and according to Table 1, 14.3203 dB may be used to support 2 bits, the SNR margin for that particular unloaded carrier is approximately 5 dB. This margin may be lower than required or requested SNR margin. But these carriers can be analyzed for possible loading by borrowing power from loaded carriers with excess margin.

At step 320, the total surplus power is calculated for the assumed loaded carriers. The surplus power accounts for excess power a carrier may have. For instance, if a carrier has two bits loaded, then the carrier requires about 14 dB. Assuming a measured SNR level of 22 dB and requested SNR margin of 6 dB, the carrier has (22-6)-14=2 dB of excess power. The power for all of the loaded carriers is added up to generate surplus power.

At step 330, an unloaded channel having the largest SNR margin (calculated in step 310), if any, is located. Likewise, two loaded channels with the largest SNR margin (i.e., a loaded carrier may have excess SNR and consequently a larger SNR margin than the required margin) if any, are located.

If one unloaded carrier is found, a power requirement referred to as $pr_{inactive}$ (referred to as px in FIG. 3) for allocating two bits onto the one carrier, preferably the one carrier with the largest SNR margin, is determined. Likewise, if two carriers with largest SNR margins among loaded carriers are found, a power requirement referred to as $pr1_{active}+pr2_{active}$ for allocating one bit onto each of two carriers is determined, where $pr1_{active}$ (referred to as py1 in FIG. 3) corresponds to the other carrier of the two loaded carriers and $pr2_{active}$ (referred to as py2 in FIG. 3) corresponds to one of the two loaded carriers. At step 350, if the relationship $pr_{inactive}<(pr1_{active}+pr2_{active})$ is true then two bits are allocated onto the initially unloaded carrier at step 360. If the relationship is not true then one additional bit is allocated onto one of the two loaded carriers, preferably the carrier with the larger SNR margin at step 370. At step 380, the SNR margin and the surplus power is recalculated.

The steps given in FIG. 3 are preferably repeated until the surplus power is insufficient (at step 340) to allocate two bits on one initially unloaded carrier and insufficient to allocate one bit onto one of the loaded carriers.

Figure 4:
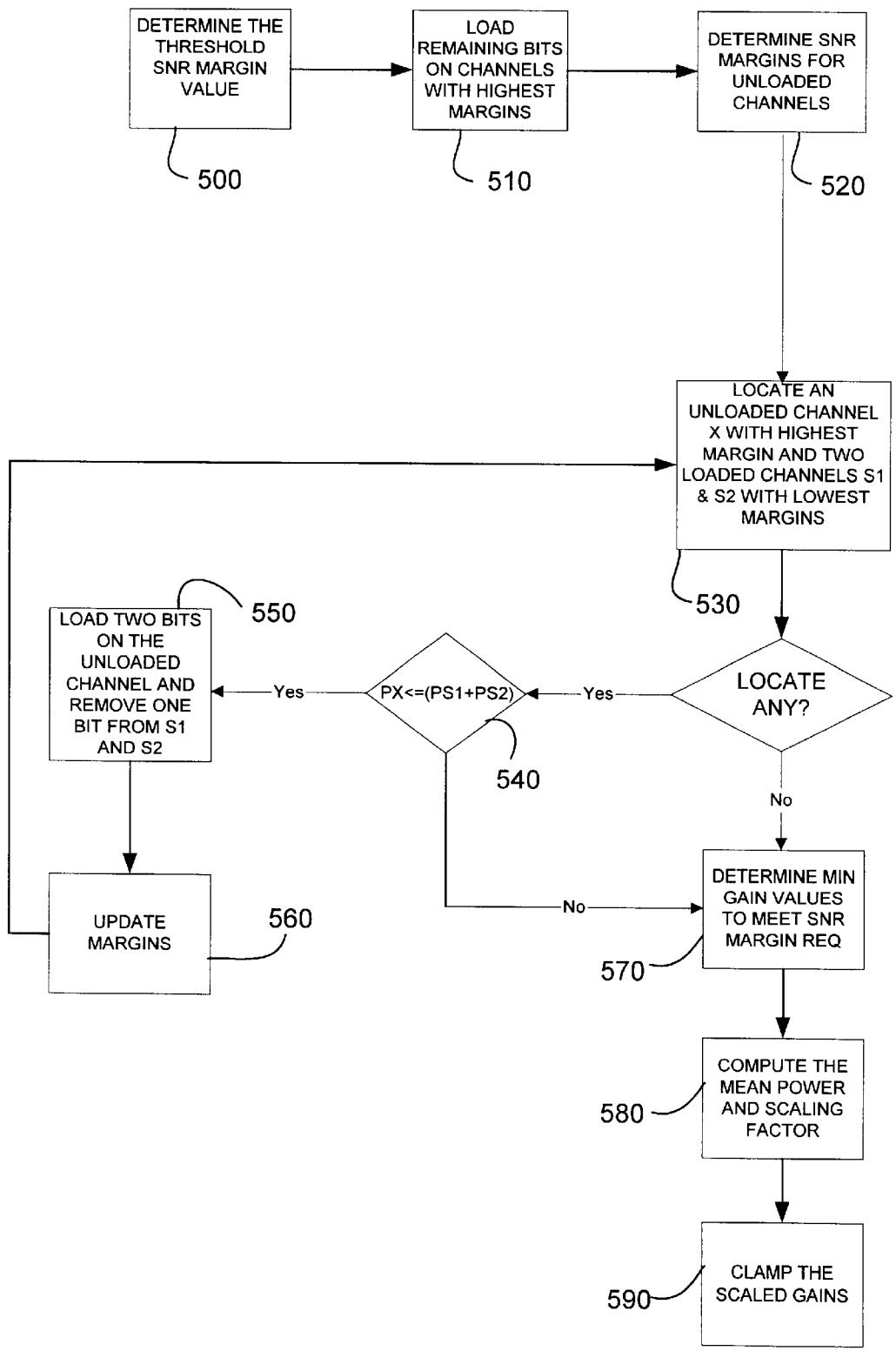
FIG. 4 is a flow diagram of a preferred embodiment of a method for allocating a fixed number of bits.

FIG. 4 illustrates a flowchart of an exemplary method for loading a required number of bits/frame N, optimizing the average SNR margin, and equalizing SNR margins. At step 500, a threshold SNR margin value is determined, which results in loading K bits, such that K≦N where N is a fixed number of bits (e.g., N may be found using the method given is FIG. 3 or N may be the actual number of bits/frame that the ATU-C has requested to be loaded).

The threshold SNR margin is such that, if the required SNR margin value is reduced below the threshold SNR margin by a small decrement, the number of bits loaded would be greater than N. If the required SNR margin value is increased beyond the threshold SNR margin, the number of bits loaded would be less than K. In most practical SNR distributions, it may be possible to find the threshold SNR margin which results in loading N bits. (i.e. N=K). In some cases K is less than N by a few bits.

To determine the threshold SNR margin in accordance to the preferred embodiments two extreme values of SNR margin are chosen such as -48 dB and +48 dB. The assumption is that the actual SNR margin when N bits are loaded for a given SNR distribution, would lie somewhere in between −48 dB and +48 dB. With the exemplary −48 dB margin requirement, the number of bits loaded would be much higher than N and with +48 dB, the number of bits loaded may be less than N and perhaps closer to 0 dB. Then, a third value of SNR margin midway between −48 dB and +48 dB (e.g., (−48+48)/2=0 dB) is chosen. The number of bits loaded would then be greater than or equal to N or less than N. If the number of bits loaded is less than N, then 0 dB becomes higher limit and −48 dB becomes the lower limit. If the number of bits loaded is greater than or equal to N, then 0 dB becomes the lower limit and 48 dB becomes the higher limit. This process may be repeated iteratively to reduce the spread between higher and lower limit, until the high and low limit converge to the threshold SNR margin.

At step 510, the remaining bits (N–K) are loaded preferably onto carriers having higher margins. Loading bits onto carriers with the highest margins simplifies equalization of BER across different carriers by allowing smaller variations in fine gain values.

Then at step 520, SNR margins are calculated for initially unloaded bins to determine candidate carriers to load additional bits to maximize utilization of the available carriers. FIG. 3 refers to one such suitable method for calculating the SNR margin.

At step 530, the initially unloaded carrier having the largest SNR margin is determined and the two loaded carriers having the lowest SNR margins are also found. If an unloaded carrier is found according to step 530, a power requirement referred to as $pr_{inactive}$ (referred to as px in FIG. 4) for allocating two bits onto this carrier is determined. Likewise, if two loaded carriers are found a power savings referred to as $ps1_{active}+ps2_{active}$ for removing one bit from each of two carriers is determined. In this example $ps1_{active}$ (referred to as ps1 in FIG. 4) corresponds to the other carrier of the two loaded carriers and $ps2_{active}$ (referred to as ps2 in FIG. 4) corresponds to one of the two loaded carriers. At step 540, if the relationship $pr_{inactive} \leq (ps1_{active}+ps2_{active})$ is true, then according to step 550 two bits are loaded onto the initially unloaded carrier and one bit is removed from each one of the two loaded carriers. At step 560 the margins are preferably updated and the steps 530, 540, 550, and 560 are repeated until $pr_{inactive}$ is greater than $ps1_{active}+ps2_{active}$.

At step 570, the lowest gain values that may satisfy the SNR margin requirement for each carrier is determined. With some carriers, the SNR margin is lower than the desired margin, in which case the gain is increased to meet the margin requirement. With other carriers, the SNR margin is higher that the desired margin, in which case the gain has to be decreased to meet the margin requirement.

At step 580, a scaling factor is determined in accordance with a mean power for each of the plurality of carriers. The gain values equalize margins over the different carriers which equalizes bit error rates and the scaling factor ensures that the power spectral density matches the nominal value. The determined scaling factor is then used to scale the gain value for each of the plurality of carriers.

At step 590, the scaled gain values are clamped within the +/−2.5 dB range.

For systems utilizing error correction such as through the use of trellis coding, the number of bits to be loaded on the carriers, say N bits, may be dependent on the number of carriers utilized during communication. Thus, if an initially unloaded carrier becomes a loaded carrier, that is, the carrier is loaded with 2 bits; the number of loaded carriers increases by one, perhaps affecting the total number of bits that must be loaded. For instance, if the number of active carriers (i.e., before the additional carrier is loaded with 2 bits) is even and one more carrier is loaded, then an additional bit should be loaded to support the extra carrier (e.g., N+1 bits). If the number of active carriers before the change is odd and one more carrier is loaded, then the number of bits that should be loaded is N. This has to be taken into account when applying this invention for the case of trellis coding.

The system and method for bit loading enhancement makes a concerted effort to re-activate unloaded channels perhaps leading to increased throughput. The system and method attempts to bit load initially unloaded carriers to increase the frame size transmitted over a set of channels. By bit loading an initially unloaded carrier by increasing power, the frame size is increased by two bits whereas increasing power on a loaded carrier results in an increased frame size of at most one bit. To accomplish increased throughput by loading an initially unloaded carrier, power is obtained from carefully chosen loaded carriers and applied to initially unloaded carriers attempting to reactivate the initially unloaded carriers. As a result, the set of carriers may have a net gain of data carrying bits without increasing the nominal power spectral density of the transmitted discrete multitone signal within the pass band. Thus, the system and method attempts to re-activate unloaded channels to increase available throughput for both upstream and downstream channels.

Furthermore, the margins are equalized and the average SNR margin is maximized. By equalizing the margins, the bit error rate may remain generally constant across the utilized carriers. By maximizing the average SNR margin, the carriers may tolerate a greater margin of channel noise before the bit error rate for the data loaded on the carriers increases.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method for determining an extended bit capacity for a plurality of carriers, wherein a first portion of the plurality of carriers are loaded and a second portion of the plurality of carriers are initially unloaded, the method comprising:

determining a first power requirement for allocating one bit onto each of two carriers of the first portion of the plurality of carriers;

determining a second power requirement for allocating two bits onto one carrier of the second portion of the plurality of carriers; and allocating two bits onto the one carrier of the second portion of the plurality of carriers in accordance with the first power requirement and the second power requirement.

2. A computer readable medium having stored therein instructions for causing a central processing unit to execute the method of claim 1.

3. The method of claim 1 further comprising the step of determining a plurality of signal to noise margins for the plurality of carriers.

4. The method of claim 3 wherein determining a first power requirement comprises:

choosing two carriers from the first portion of the plurality of carriers with the two largest signal to noise margins.

5. The method of claim 3 wherein determining a second power requirement comprises:

choosing one carrier from the second portion of the plurality of carriers with the largest signal to noise margin.

6. The method of claim 1 wherein allocating the two bits onto one carrier of the second portion of the plurality of carriers is performed in accordance with the relationship given by $Pr_{inactive} < (Pr1_{active} + pr2_{active})$, where $pr_{inactive}$ is the first power requirement and where $pr1_{active} + pr2_{active}$ is the second power requirement.

7. The method of claim 6 further comprising the step of allocating one bit onto one of the two carriers of the first portion of the plurality of carriers and is performed in accordance with the relationship given by $pr_{inactive} \geq (pr1_{active} + pr2_{active})$, where $pr_{inactive}$ is the first power requirement and where $pr1_{active} + pr2_{active}$ is the second power requirement.

8. The method of claim 7 further comprising the step of determining a plurality of signal to noise margins for the plurality of carriers.

9. The method of claim 8 wherein one of the carriers of the first portion is chosen from the first portion of the plurality of carriers with the largest signal to noise margin.

10. The method of claim 7 further comprising the step of determining a surplus power from the first portion of the plurality of carriers.

11. The method of claim 10 wherein the steps of: determining a first power requirement, determining a second power requirement, and allocating one bit further repeats until the surplus power is insufficient to load one bit onto one of the first portion of the plurality of carriers.

12. The method of claim 1 wherein the steps of: determining a first power requirement, determining a second power requirement, and allocating two bits further repeats until the surplus power is insufficient to load two bits onto the one of the second portion of the plurality of carriers.

13. A method for optimizing the average signal to noise margin for a plurality of carriers, wherein a first portion of the plurality of carriers are loaded and a second portion of the plurality of carriers are initially unloaded, the method comprising:

determining a power saving resulting from removing one bit from each of two carriers of the first portion of the plurality of carriers;

determining a power requirement to load two bits onto one carrier of the second portion of the plurality of carriers; and loading two bits onto one carrier of the second portion of the plurality of carriers in accordance with the power saving and the power requirement.

14. A computer readable medium having stored therein instructions for causing a central processing unit to execute the method of claim 12.

15. The method of claim 13 further comprising determining gain values that satisfy signal to noise margin requirement for each of the plurality of carriers.

16. The method of claim 13 further comprising determining a scaling factor in accordance with a mean power for each of the plurality of carriers, and wherein the scaling factor scales the gain value for each of the plurality of carriers.

17. The method of claim 13 further comprising clamping the gain value within the +/--2.5 dB range.

18. The method of claim 13 further comprising loading a plurality of bits onto the portion of the plurality of carriers.

19. The method of claim 13 further comprising determining a plurality of signal to noise margins for the plurality of carriers.

20. The method of claim 19 wherein determining a power requirement comprises choosing one carrier from the second portion of the plurality of carriers with the largest signal to noise margin.

21. The method of claim 19 wherein determining a power saving comprises choosing two carriers from the first portion of the plurality of carriers with the lowest signal to noise margin.

22. The method of claim 13 wherein loading two bits onto one carrier of the second portion of the plurality of carriers is performed in accordance with the relationship given by $pr_{inactive} \leq (Ps1_{active} + ps2_{active})$, where $pr_{inactive}$ is the power requirement and where $(ps1_{active} + ps2_{active})$ is the power saving.

23. The method of claim 13 wherein the steps of determining a power saving, determining a power requirement, and loading two bits repeats until the power requirement is less than the power saving.

* * * * *